(12) United States Patent
Guadayol Roig

(10) Patent No.: US 9,702,345 B2
(45) Date of Patent: Jul. 11, 2017

(54) METHOD OF OPERATING A WIND TURBINE

(71) Applicant: ALSTOM RENOVABLES ESPAÑA, S.L., Barcelona (ES)

(72) Inventor: Marc Guadayol Roig, Terrassa (ES)

(73) Assignee: ALSTOM Renewable Technologies, Grenoble (FR)

( * ) Notice: Subject to any disclaimer, the term of this patent is extended or adjusted under 35 U.S.C. 154(b) by 517 days.

(21) Appl. No.: 14/254,806

(22) Filed: Apr. 16, 2014

(65) Prior Publication Data

US 2014/0328678 A1 Nov. 6, 2014

(30) Foreign Application Priority Data

May 3, 2013 (EP) .................................... 13382165

(51) Int. Cl.
*F03D 7/04* (2006.01)
*F03D 7/02* (2006.01)

(52) U.S. Cl.
CPC .......... *F03D 7/046* (2013.01); *F03D 7/0224* (2013.01); *F03D 7/0292* (2013.01); *F03D 7/045* (2013.01); *F05B 2270/331* (2013.01); *F05B 2270/332* (2013.01); *F05B 2270/404* (2013.01); *Y02E 10/723* (2013.01)

(58) Field of Classification Search
None
See application file for complete search history.

(56) References Cited

U.S. PATENT DOCUMENTS

2008/0086281 A1* 4/2008 Santos .................. F03D 7/0292
702/127
2008/0206051 A1* 8/2008 Wakasa ................. F03D 7/0224
416/41
(Continued)

FOREIGN PATENT DOCUMENTS

EP 1 911 968 4/2008
EP 2 325 480 5/2011
(Continued)

OTHER PUBLICATIONS

European Search Report for EP 13382165, mailed Oct. 10, 2013, 6 pgs.

*Primary Examiner* — Jason Lin
(74) *Attorney, Agent, or Firm* — Dority & Manning, P.A.

(57) ABSTRACT

The present invention provides a method of operating a wind turbine having a rotor with a plurality of blades, a system for determining one or more loads on the wind turbine, a historical register of data on the wind turbine operation, and a control system for controlling one or more operational parameters of the wind turbine. The method comprises determining the loads on the wind turbine, and storing the determined loads on the wind turbine in the historical register. The method further comprises obtaining, from the historical register, a characteristic indicative of the loads on the wind turbine accumulated over time, and determining one or more wind thrust limits depending on the obtained characteristic indicative of the loads accumulated over time. One or more operational parameters of the wind turbine are controlled to keep the wind thrust on the wind turbine within the determined wind thrust limits.

15 Claims, 4 Drawing Sheets

(56) References Cited

U.S. PATENT DOCUMENTS

| | | | |
|---|---|---|---|
| 2013/0103202 A1* | 4/2013 | Bowyer | F03D 7/0292 700/275 |
| 2013/0125632 A1* | 5/2013 | Bjerge | F03D 11/0091 73/112.01 |
| 2013/0161955 A1* | 6/2013 | Dalsgaard | F03D 7/0224 290/44 |
| 2013/0320674 A1* | 12/2013 | Ingram | H02P 9/04 290/43 |
| 2014/0219796 A1* | 8/2014 | Caruso | F03D 7/0244 416/1 |
| 2014/0248123 A1* | 9/2014 | Turner | F03D 7/0292 415/1 |
| 2014/0288855 A1* | 9/2014 | Deshpande | F03D 17/00 702/34 |

FOREIGN PATENT DOCUMENTS

| | | |
|---|---|---|
| WO | WO 2011/157272 | 12/2011 |
| WO | WO 2013/044925 | 4/2013 |

\* cited by examiner

METHOD OF OPERATING A WIND TURBINE

This application claims the benefit of European Patent Application EP 13382165.2 filed 3 May 2013, the entire contents of which are hereby incorporated by reference for all purposes.

The present invention relates to a method of operating a wind turbine, and to a wind turbine suitable for performing such a method.

BACKGROUND ART

Modern wind turbines are commonly used to supply electricity into the electrical grid. Wind turbines of this kind generally comprise a tower and a rotor arranged on the tower. The rotor, which typically comprises a hub and a plurality of blades, is set into rotation under the influence of the wind on the blades. Said rotation generates a torque that is normally transmitted through a rotor shaft to a generator, either directly or through the use of a gearbox. This way, the generator produces electricity which can be supplied to the electrical grid.

During operation of a wind turbine, its structure and components may undergo undesired movements, i.e. oscillatory or repeating displacements in any direction (fore-aft vibrations, side-to-side or lateral vibrations, longitudinal vibrations, torsional vibrations, . . . ) of different magnitudes and of different frequencies (high or low, constant or varying). These movements may be caused by different factors, e.g. by the wind pushing the wind turbine (i.e. wind thrust), blades locally disturbing the wind flow, vibrations transmitted from the gearbox to other components (e.g. tower), rotor movements, nacelle imbalances, vibrations from the hub transmitted to the tower etc.

If a wind turbine is subjected to the above mentioned collateral movements (e.g. vibrations) during a prolonged period of time, fatigue damage may result. Fatigue typically occurs with varying loads, e.g. alternating tension and compression. Fatigue may lead to a reduced life time of the wind turbine and/or its components. A further complicating factor is that the size of wind turbines (rotor, nacelle, tower, etc.) keeps increasing. Also, as wind turbines become higher, the effect of vibrations becomes more critical.

Furthermore, wind turbines are often grouped together in so-called wind farms. In a wind farm there may be a relatively short distance between wind turbines. Thus, action of the wind on one wind turbine may produce a wake which may be received by another wind turbine. A wake received by a wind turbine may cause high loads (particularly vibrations) and/or a reduction of electrical power production in this wind turbine. These high loads may damage components of the wind turbine, and these damages may reduce the life and/or the performance of the wind turbine.

One of the most impacting effects, which may potentially cause fatigue on the wind turbine, is the thrust exerted by the wind on the structure of the wind turbine. Wind thrust and its variation may depend on environmental (external) conditions and conditions inherent to the wind turbine itself (internal conditions). An external condition may e.g. be the wind speed, whereas internal conditions may e.g. be the pitch angle of the blades, the generator torque and the rotational speed of the rotor, etc. For example, a given wind speed faced with small pitch angles (of e.g. zero degrees) may cause a higher thrust than the same wind speed faced with greater pitch angles (of e.g. ninety degrees). Estimations of the thrust may be performed from parameters such as wind speed, pitch angles, rotor speed. Equivalently, a control of the thrust may be performed by suitably varying operational parameters of the wind turbine (e.g. pitch angles, rotor speed, generator torque).

WO2011157272A2 discloses a method of controlling a wind turbine having a rotor with pitchable wind turbine blades and a generator for producing power, wherein a pitch reference value for the wind turbine blades is determined, and an operational parameter representing a loading on the wind turbine rotor exerted by the wind is measured at time intervals. A variation parameter reflecting a variation of the operational parameter over time is determined and used in the determination of a minimum pitch limit value of the pitch reference value. The wind turbine is then controlled according to the pitch reference value only if the pitch reference value is above or equal to the minimum pitch limit value, and otherwise according to the minimum pitch limit value. The minimum pitch limit value may reflect the minimum pitch for maintaining the thrust on the rotor below or at a maximum allowable thrust level. One objective of maintaining the thrust on the rotor below or at this maximum allowable thrust level is to ensure that the loads on the turbine are kept within acceptable limits in all wind conditions.

The present invention aims at improving the prior art systems.

SUMMARY OF THE INVENTION

In a first aspect, the present invention provides a method of operating a wind turbine having a rotor with a plurality of blades, a system for determining one or more loads on the wind turbine, a historical register of data on the wind turbine operation, and a control system for controlling one or more operational parameters of the wind turbine. The method comprises determining the loads on the wind turbine, and storing the determined loads on the wind turbine in the historical register. The method further comprises obtaining, from the historical register, a characteristic indicative of the loads on the wind turbine accumulated over time, and determining one or more wind thrust limits depending on the obtained characteristic indicative of the loads accumulated over time. One or more operational parameters of the wind turbine are controlled to keep the wind thrust on the wind turbine within the determined wind thrust limits.

The term "operational parameters of the wind turbine" is used to refer to those parameters internal to the wind turbine which may be varied (or controlled) to change the behaviour of the wind turbine. For example, the wind speed would not be an operational parameter of the wind turbine, since wind speed is a parameter that cannot be controlled by the wind turbine because it is external to the wind turbine. For example, pitch angles (which could be varied by means of pitch systems), orientation of the rotor (which could be varied by means of a yaw system), rotor speed, generator torque etc. are considered "operational parameters inherent to the wind turbine".

The determined loads on the wind turbine may be stored in the historical register under diverse criteria. For example, each value or set of values representing a determined load may be kept individually, and the characteristic indicative of the accumulated loads over time may be obtained each time (when required) from some or all the values representing loads stored in the historical register. In this case, determination of the characteristic indicative of the accumulated loads over time may comprise aggregating some or all the values representing loads stored in the historical register.

Alternatively or in addition to the above criteria, values representing determined loads may be kept according to diverse granularities, i.e. they may be aggregated under different criteria. For example, aggregations according to different time intervals may be taken into account, such as e.g. aggregations per day, week, month, year, etc. A global aggregation of loads suffered by the wind turbine along its life may also be considered. Then, determination of the characteristic indicative of the accumulated loads over time may take into account different time intervals depending on the granularity used to store the determined loads.

Apart from time intervals, other dimensions may be considered to define the granularity under which the determined loads are kept in the historical register. For example, the determined loads may be kept further taking into account the region of the wind turbine where the loads have been detected (e.g. blades, tower, nacelle, etc.). A multidimensional analysis may thus be performed to determine the characteristic indicative of the accumulated loads over time, which may comprise more than one characteristic value depending on the approach used to perform said multidimensional analysis.

Other than aggregation of the values representing the loads in the historical register, a characteristic indicative of loads accumulated over time may take many alternative suitable forms. In an example, a characteristic indicative of accumulated loads may be the number of times a certain predetermined load threshold is exceeded, or the number of times a predetermined load threshold is exceeded in a unit of time (e.g. every hour, day or week or month). In another example, a characteristic indicative of accumulated loads, may be the number of times a specific oscillation (of specific direction, frequency or amplitude) has occurred. In all cases, the characteristic indicative of loads accumulated over time may be calculated as a ratio of the above-mentioned characteristics and the expected values of said characteristics over the life time of a wind turbine as determined from, e.g. simulations.

In accordance with the first aspect, wind thrust limits are not necessarily determined based on an instantaneous load or instantaneous wind speed. Rather, one or more wind thrust limits are determined based on the accumulated loads on the wind turbine, which may permit flexibly varying the thrust limits in a more relaxed or restricted way in some situations. For example, an expected life time and acceptable accumulated loads during its expected life may be attributed to a wind turbine. Also, a most suitable (e.g. default) thrust limit may be determined depending on the current (or recent) operational conditions. However, if the wind turbine is at e.g. the 50% of its expected life and the accumulated loads are at e.g. the 30% of the acceptable accumulated loads during its life, a more relaxed (less restrictive) thrust limit than the theoretically most suitable thrust limit may be permitted under "special" conditions, such as e.g. when a high demand of power occurs.

Additional flexibility may be provided by the proposed method when multidimensional granularities for the accumulated loads are considered, by e.g. attributing different weights to different dimensions and/or different values of a given dimension. For example, a two dimensional granularity may be based on time intervals (first dimension) and regions of the wind turbine wherein loads were detected (second dimension). This two dimensional granularity may permit e.g. giving a higher weight to loads accumulated on the blades than to loads on the nacelle (since the nacelle may be assumed to be more robust or generally more overdimensioned than blades). Alternatively, or additionally, a distinction could also be made between loads on the blades and loads on the tower.

It is thus possible to have a global ratio between the elapsed life time (e.g. 50%) and the accumulated loads hitherto (e.g. 52%). In this case, it would be recommendable to maintain the default thrust limit(s). However, it is possible to have a distribution of the globally accumulated loads (e.g. 52%) between the tower (e.g. 60%) and the blades (e.g. 40%) which may permit a temporary relax of the default thrust limit(s) (since the loads accumulated on the blades have a higher weight than loads accumulated on the tower).

Other parameters which could be additionally taken into account for determining the wind thrust limits could refer to e.g. the age of the wind turbine, the location of the wind turbine, accumulated mechanical wear, historical data from other wind turbines, etc. The limitation of the maximum wind thrust may be increased as the age of the wind turbine increases; if the wind turbine is located in a site which may be considered to have a particularly turbulent wind, the limitation of the thrust may be somewhat more restricted; maintenance operations (by corresponding technicians) may produce quantification/estimation data of mechanical wear, which could be added to the historical register, such that the thrust could be limited also depending on said mechanical wear data; historical data from previous wind turbines (similar to the current one) may also be added to the historical register to be taken into account for limiting the thrust.

In some examples of the method, determining the one or more wind thrust limits may comprise determining a maximum wind thrust limit, such that the operational parameters of the wind turbine are controlled so as to keep the wind thrust on the wind turbine below the determined maximum wind thrust limit.

Optionally, the determined maximum wind thrust limit also depends on the rate of change of the characteristic indicative of the loads accumulated over time. This maximum wind thrust limit may be decreased if the rate of change of the characteristic indicative of the loads accumulated over time increases (or is high), and may be increased if the rate of change of the characteristic indicative of the loads accumulated over time decreases.

In other words, the wind thrust may be limited by defining a maximum wind thrust limit, such that the wind turbine may be operated in such a way that this maximum wind thrust limit cannot be exceeded. A main cause of mechanical wear of components of the wind turbine is the amplitude of wind thrust variation. With a constraint based on a maximum wind thrust limit, the amplitude of thrust variations during operation of the wind turbine may be restricted, which may cause reduction of mechanical wear and, consequently, the life of the wind turbine can be extended and/or it may be ensured that an expected life time of the wind turbine (design life time) is achieved.

Alternatively or in addition to defining a maximum wind thrust limit, the method may further comprise determining a minimum wind thrust limit, in such a way that the operational parameters of the wind turbine are controlled as to keep the wind thrust on the wind turbine above the determined minimum wind thrust limit.

Optionally, the minimum wind thrust limit also depends on the rate of change of the characteristic indicative of the loads accumulated over time. This minimum wind thrust limit may be increased if the characteristic indicative of the accumulated loads over time increases, and may be decreased if the characteristic indicative of the accumulated loads over time decreases.

Another option for limiting the wind thrust may be to define a minimum wind thrust limit, such that the wind turbine may be operated in such a way that this minimum wind thrust limit cannot be exceeded. As commented before, a main cause of mechanical wear of components of the wind turbine is the amplitude of thrust variation. With such a constraint based on minimum wind thrust limit, the amplitude of thrust variations during operation of the wind turbine may also be restricted. This may cause reduction of mechanical wear and, consequently, the life of the wind turbine can be extended and/or ensured to satisfy an expected life time for the wind turbine. Embodiments combining both maximum and minimum wind thrust limits may provide a more powerful way of limiting wind thrust variations.

By making wind thrust limits dependent on a rate of change of the characteristic indicative of loads that have been accumulated, the control system may be more flexible and quicker to react to a change in conditions. For example, if a change has occurred in the geographical surroundings of a wind turbine, e.g. a neighbouring wind park has been constructed or trees in the surrounding areas have grown, a rate of change of the characteristic indicative of the accumulated loads may be affected. A change in the rate of change may be more quickly detected in such conditions.

Alternatively or in addition to defining a maximum wind thrust limit and/or a minimum wind thrust limit, the method may comprise determining a maximum rate of wind thrust variation, such that the wind turbine is controlled to ensure that a variation of the wind thrust on the wind turbine is at a rate below the determined maximum rate of wind thrust variation. This maximum rate of wind thrust variation may optionally also depend on the rate of change of the characteristic indicative of the accumulated loads.

The determined maximum rate of wind thrust variation may increase if the characteristic indicative of the loads accumulated over time decreases; and the determined maximum rate of wind thrust variation may decrease if the characteristic indicative of the loads accumulated over time increases.

Pitch systems and/or yaw systems are used to vary pitch angles and/or rotor orientation for limiting the wind thrust. The mechanical wear that these systems (pitch, yaw systems . . . ) suffer, will typically increase if they are used more often. Therefore, another way of reducing mechanical wear may be to define a maximum rate of wind thrust variation, such that the wind turbine may be operated in a manner that this maximum rate of wind thrust variation cannot be exceeded. This operation of the wind turbine aimed at not exceeding said maximum rate of wind thrust variation may be based on limiting the rate at which pitch and/or yaw systems work. Embodiments combining both maximum and/or minimum wind thrust limits and maximum rate of wind thrust variation may provide an even more powerful way of limiting wind thrust variations.

Examples may be implemented using Model Predictive Control (MPC) based on imposing a constraint on the wind thrust on the wind turbine depending on the characteristic indicative of the loads accumulated over time.

Model predictive control (MPC) aims at effectively solving problems of control and automation of processes that are characterized by having a complicated, multivariate and/or unstable dynamic behaviour. The control strategy underlying this type of control uses a mathematical model of the process to be controlled to predict the future behaviour of that system and, based on this future behaviour, it can predict future control signals.

MPC is part of the so-called optimal controllers, i.e. those in which actuations correspond to an optimization of a criterion. The criterion to be optimized, or the "cost function", is related to the future behaviour of the system, which is predicted by considering a dynamic model thereof, which is called the prediction model.

MPC is a flexible, open and intuitive technique, which permits dealing with linear and nonlinear, multi-variable and mono-variable systems by using the same formulation for the algorithms of the controller. Moreover, the MPC control laws respond to optimization criteria, and allow incorporating constraints in the synthesis or implementation of the controller. MPC also provides the ability of incorporating constrains in the calculations of the actuations.

Implementations that are based on MPC may incorporate at least one constraint in terms of wind thrust on the wind turbine depending on accumulated loads. These implementations may thus provide a flexible, open and intuitive solution to the problem of ensuring or extending the life of a wind turbine in a quite optimum manner.

In some examples, the system for determining loads on the wind turbine may comprise at least one load sensor in the root of at least one of the blades, such that load measurements from the at least one load sensor may be obtained. Loads on the wind turbine may be determined from said obtained load measurements. In other embodiments, other types of load sensors may be used and located on other regions of the wind turbine, such as e.g. the tower, or the nacelle.

In some examples, the system for controlling one or more operational parameters of the wind turbine may comprise one or more pitch systems. Alternatively or in addition to pitching the blades, keeping the thrust on the wind turbine within the determined thrust limits may be achieved by suitably varying the rotor speed (by e.g. varying the generator torque), and/or properly varying the orientation of the rotor through a corresponding yaw system, etc.

In some examples, the wind turbine may further comprise a system for determining an instantaneous representative wind speed, such that the method may further comprise determining the instantaneous representative wind speed, and making at least one of the wind thrust limits further dependent on the determined instantaneous representative wind speed.

The instantaneous representative wind speed may be determined based on a wind speed measurement of a nacelle mounted anemometer. This wind speed measurement of the nacelle mounted anemometer may be an average wind speed measured over a short period of time. This short period of time may be between 1-5 seconds. More particularly, this short period of time may be between 2-4 seconds. Still more particularly, this short period of time may be approximately 3 seconds.

A nacelle mounted anemometer will generally, due its location on top of the nacelle and behind the rotor, not measure the wind speed very accurately and its measurements may show a wind speed that largely varies with a high frequency. An attenuation of this inaccuracy may be achieved by obtaining an average wind speed in the way(s) mentioned before, and using said average as the instantaneous representative wind speed in subsequent calculations. Instead of a nacelle mounted anemometer, e.g. a LIDAR could be used.

Wind speed may be a relevant parameter (which is not internal to the wind turbine, but external) to be taken into account for limiting the wind thrust. For example, at supra-nominal or sub-nominal wind speeds or wind speeds close to the nominal wind speed (i.e. when power is being generated at a maximum or almost maximum level), the wind thrust may be induced to vary in a more or less restricted manner. In general, sub-nominal wind speeds would not generally require (particularly restricted) limitations of the wind thrust, while supra-nominal wind speeds would generally require stronger limitations.

Wind speed may be another parameter to be stored in the historical register along with the determined loads on the wind turbine. In particular, wind speed may be one of the dimensions defining the granularity under which load values may be accumulated in the historical register. All these principles may make methods provided by the invention to be even more flexible and accurate with respect to the aim of extending the life of the wind turbine and/or ensuring its expected life time will be substantially accomplished.

In another aspect, a wind turbine is provided that is configured to perform the method of operating a wind turbine as previously described.

In yet a further aspect, a method of operating a wind turbine having a rotor with a plurality of blades, one or more pitch systems for rotating the blades around their longitudinal axes, a generator, and a control system for controlling pitch angles of the blades and a torque of the generator is provided. The method comprises optimizing a cost function using a Model Predictive Control (MPC) strategy.

In some embodiments of this aspect, the cost function to be optimized may be the electrical power generated over a life time of the wind turbine. In other embodiments, the cost function to be optimized may be the financial compensation for the electrical power generated over the life time of the wind turbine. In yet further embodiments, the cost function to be optimized may be to match as closely as possible the electrical power generated to the electrical power demanded (by e.g. a grid operator).

In any of the embodiments of this aspect, the wind turbine may further comprise a system for determining one or more loads on the wind turbine, and a boundary condition in the MPC process may be a boundary condition based on a load. Optionally, the boundary condition based on the load may be a boundary condition based on the thrust on the wind turbine. And optionally, the boundary condition may be a maximum thrust, a minimum thrust or a maximum rate of change of thrust. Alternatively, or additionally, the boundary condition based on one or more loads may be a function of the loads accumulated over time (optionally stored in a historical register of loads). These loads, in some examples, may be expressed by a characteristic or parameter indicative of the accumulated loads as explained in other parts of the present disclosure.

In any of these embodiments of this aspect, the boundary conditions based on loads may be "soft" boundary conditions or "hard" boundary conditions. Hard boundary conditions are those conditions that may never be violated and soft boundary conditions are those boundary conditions that are preferably not violated, but may occasionally be violated to a limited extent. Violation of such a soft constraint may be suitable when the expected gain in the cost function to be optimized is relatively or disproportionally high. Particularly, certain thrust limits may be set as soft constraints, which may be violated under certain conditions, because they do not cause breakdown or interruption of the wind turbine, but rather they cause some fatigue damage. This fatigue damage could be compensated during other periods of operation. An example of a typical hard boundary condition may be an inherent pitch speed limit, because the pitch motor physically cannot rotate the blade at a higher speed. Similarly, a hard boundary condition may be the maximum torque that may be applied to the generator.

In any of these examples of this aspect, wherein a boundary condition is based on one or more loads, the boundary condition may vary as a function of wind speed. Alternatively, the boundary condition may be fixed, e.g. a maximum thrust limit regardless of the instantaneous wind speed or any other factor.

In any of these examples of this aspect, the blades of the wind turbine may further comprise one or more flaps and/or deformable trailing edge surfaces and a control system for controlling these flaps and/or deformable trailing edge surfaces. Other control parameters may thus be provided for optimizing the cost function in the MPC process given certain boundary conditions.

A variable speed wind turbine may typically be controlled by varying the generator torque and the pitch angle of the blades. As a result, aerodynamic torque, rotor speed and electrical power will vary. Taking this into account, and with respect to the example shown in FIG. 4, typically four (and possibly more) operational ranges may be considered in a conventional control strategy.

In a first operational range, from the cut-in wind speed to a first wind speed (e.g. approximately 5 or 6 m/s), the rotor may be controlled to rotate at a substantially constant speed that is just high enough to be able to accurately control it. The pitch angle of the blades in this first operational range is maintained at 0° (the default position). The cut-in wind speed may be e.g. approximately 3 m/s.

In a second operational range, from the first wind speed (e.g. approximately 5 or 6 m/s) to a second wind speed (e.g. approximately 8.5 m/s), the objective is generally to maximize power output while maintaining the pitch angle of the blades constant so as to capture maximum energy. In order to achieve this objective, the generator torque and rotor speed may be suitably varied. In this operational range, the pitch angle of the blade is generally also maintained at 0°.

In a third operational range, which starts at reaching nominal rotor rotational speed and extends until reaching nominal power, the rotor speed may be kept constant, and the generator torque may be varied to such effect. In terms of wind speeds, this third operational range extends substantially from the second wind speed to the nominal wind speed e.g. from approximately 8.5 m/s to approximately 11 m/s. Also, in this operational range, the blades may generally be maintained in the default pitch position.

In a fourth operational range, which may extend from the nominal wind speed to the cut-out wind speed (for example from approximately 11 m/s to 25 m/s), the blades may be rotated ("pitched") to maintain the aerodynamic torque delivered by the rotor substantially constant. In practice, the pitch may be actuated such as to maintain the rotor speed substantially constant. At the cut-out wind speed, the wind turbine's operation is interrupted.

In the first, second and third operational ranges, i.e. at wind speeds below the nominal wind speed (the sub-nominal zone of operation), the blades are normally kept in a constant pitch position, namely the "below rated pitch position" at wind speeds equal to or below nominal wind speed. Said default pitch position may generally be close to a 0° pitch angle. The exact pitch angle in "below rated" conditions depends however on the complete design of the wind turbine. In the supra-nominal zone of operation, the blades are pitched, but the rotor speed and generator torque is maintained substantially constant.

Applying the MPC strategy in accordance with any of the embodiments of this aspect could lead to a variation in pitch angle in the sub-nominal zone of operation. Also, the MPC strategy could lead to a variation in rotor speed in the supra-nominal zone of operation.

BRIEF DESCRIPTION OF THE DRAWINGS

Particular embodiments of the present invention will be described in the following by way of non-limiting examples, with reference to the appended drawings, in which.

DETAILED DESCRIPTION OF EMBODIMENTS OF THE INVENTION

In the following description, numerous specific details are set forth in order to provide a thorough understanding of examples of the present invention. It will be understood by one skilled in the art however, that examples of the present invention may be practiced without some or all of these specific details. In other instances, well known elements have not been described in detail in order not to unnecessarily obscure the description of the present invention.

Figure 1:
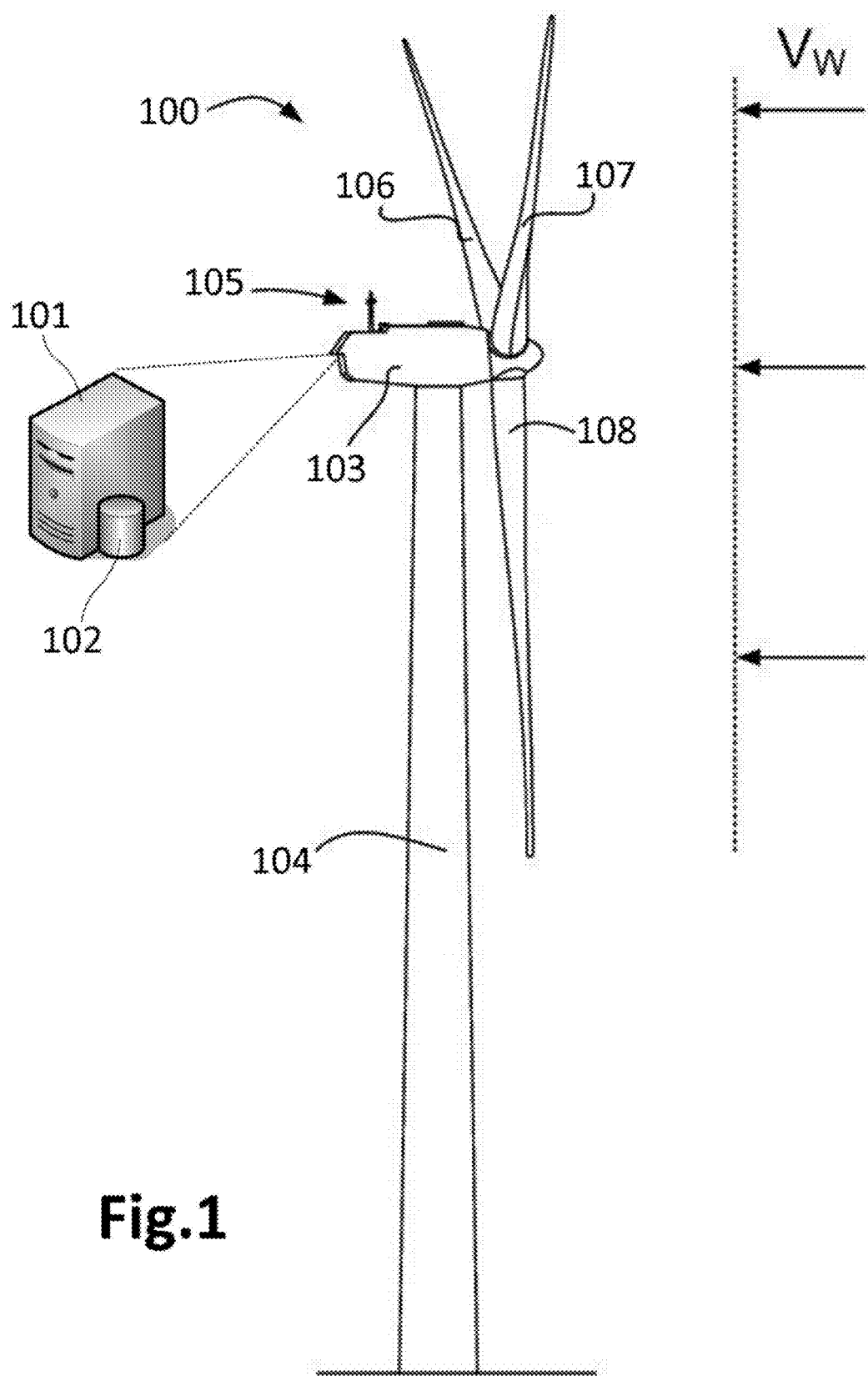
FIG. 1 is a schematic representation of a wind turbine according to embodiments of the invention.

FIG. 1 is a schematic representation of a wind turbine according to an embodiment of the invention. This wind turbine 100 is shown comprising a tower 104, a nacelle 103 and a rotor with a plurality of blades 106-108 arranged on the tower 104. The wind turbine 100 may further comprise a control unit 101 with a memory (e.g. a hard disk) 102 for storing data about operation (e.g. detected loads) of the wind turbine. This control unit 101 (e.g. a computer) may be programmed to perform one or more methods provided by the invention. Details about said methods will be provided in reference to other figures.

The control unit 101 and the memory 102 may be housed in a suitable region of the wind turbine, such as e.g. inside the nacelle 103 or the tower 104. Alternatively, the control unit 101 and the memory 102 may be arranged in a remote location and connected with the turbine by means of suitable connections. The control unit acting as the control system for the wind turbine may form part of a SCADA of a wind park.

The wind turbine 100 may also comprise a system for determining loads on the wind turbine 100, which may be based on e.g. load sensors in the root of the blades 106-108, and/or load sensors on the nacelle 103, and/or load sensors on the tower, etc. A system for controlling one or more operational parameters inherent to the wind turbine 100 may also be provided in the wind turbine 100. This system (for controlling operational parameters) may comprise e.g. one or more pitch systems for pitching one or more of the blades 106-108, and/or a yaw system for orienting the rotor of the wind turbine 100 with respect to the wind $V_w$, etc.

In other embodiments, the wind turbine 100 may further comprise a system for determining an instantaneous representative wind speed, which may comprise a nacelle mounted anemometer 105. Alternatively, any other system for determining a representative wind speed can be used, such as e.g. a LIDAR, a measurement pole, etc.

Figure 3:
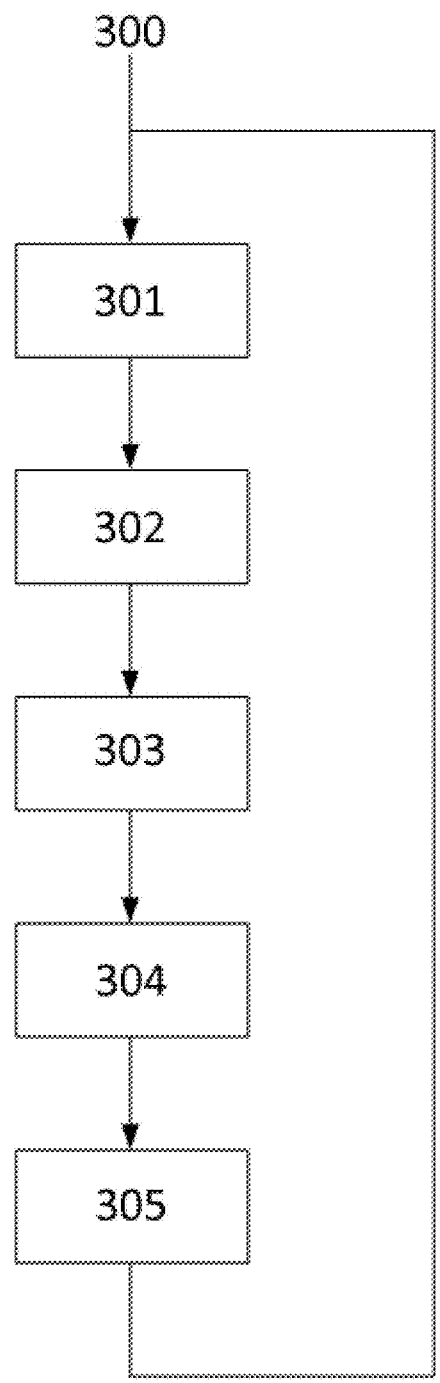
FIG. 3 is a flow chart illustrating a particular method provided by the invention.

FIG. 3 is a flow chart illustrating one example of a method provided by the invention, which could be performed by a wind turbine similar to the one shown in FIG. 1. The method is initiated at step 300, which follows to step 301 for determining loads on the wind turbine, by using a system for determining loads which may be similar to the one comprised by the wind turbine 100 of FIG. 1. At step 302, the determined loads on the wind turbine are kept (or stored) in a historical register, which may be e.g. the memory 102 of FIG. 1. Then, a characteristic indicative of the loads on the wind turbine that have been accumulated over time is obtained, at step 303, from the data stored in the historical register. This obtained characteristic may be used, at step 304, for obtaining one or more thrust limits depending on said ratio.

Once the characteristic has been obtained, one or more operational parameters (e.g. pitch adjustments, generator torque, etc.) of the wind turbine 100 may be controlled, at step 305, as to keep the wind thrust on the wind turbine 100 within the determined wind thrust limits. Once the step 305 has been completed, the method may go back to the step 301 (or step 303), such that iterations of the explained sequence of stages 301-305 can be continuously performed under a given frequency and/or till a given ending condition is satisfied.

In some examples, the processes of determining loads on the wind turbine and storing these loads in a historical register may be substantially separate from the processes for calculating one or more limits to be imposed on the thrust. They may be carried out with completely different frequencies. In as far as thrust limits are based on fatigue damage, it makes sense that the thrust limits are adjusted every week or month or every few months. On the other hand, the registration of loads may be continuous, e.g. every second or every few seconds.

In some implementations therefore, after step 305, the process does not necessarily return to step 301, but rather to step 303 in which the characteristic indicative of accumulated loads is obtained.

The characteristic indicative of the accumulated loads may be obtained by e.g. calculating a value indicating the loads accumulated by the wind turbine (e.g. along its elapsed time life), and obtaining the percentage to which corresponds said calculated indicator of accumulated loads with respect a maximum value of loads the turbine is expected to suffer (e.g. along its entire life). For instance, if the maximum value of loads is equal to 1.000 units and the calculated indicator of accumulated loads is equal to 500 units, the ratio indicative of the accumulated loads will be equal to 50%, which means that the turbine has accumulated a 50% of loads permitted along its entire time life. Then, if the elapsed time life is e.g. equal to 60% of its expected life, the method could conclude that no limit on the thrust is necessary, since 60% (elapsed time life) is greater than 50% (accumulated loads).

Other calculations (even much more complex) to obtain a characteristic indicative of the accumulated loads over time may be used. For example, some calculations may consider from which component(s) of the wind turbine load measurements have been obtained, such as e.g. blades, tower, nacelle, etc. Other parameters could be used in these calculations, such as e.g. the wind speed, since different wind speeds may define different operational ranges reflecting relevant operational conditions. In these more complex calculations, the produced characteristic indicative of the accumulated loads may comprise several accumulated load values, such that e.g. a significant value corresponding to a given part (e.g. a blade) of the wind turbine and to a given operational range (e.g. above nominal speed) may indicate a malfunction of this part during this operational range, even though an acceptable overall ratio accumulated loads may have been obtained.

The thrust suffered by the wind turbine may be estimated by applying any method known in the art. The thrust may be estimated from parameters such as e.g. the wind speed, loads on the blades, rotational speed of the rotor, etc. In some implementations, the method may further comprise one or more steps focused on estimating the thrust suffered by the wind turbine and verifying if the estimated thrust is effectively within the thrust limits determined in a previous iteration.

In some embodiments, the one or more thrust limits may comprise a maximum wind thrust limit, and/or a minimum wind thrust limit, and/or a maximum rate of wind thrust variation. Then, at step 305, the one or more operational parameters internal to the wind turbine may be controlled as to keep the wind thrust below the maximum wind thrust limit, and/or above the minimum wind thrust limit, and/or the rate at which the thrust is varied below the maximum rate of wind thrust variation.

According to some implementations, the maximum wind thrust limit may decrease depending on how much the characteristic (or optionally a ratio) indicative of the accumulated loads over time increases, and may increase depending on how much the ratio indicative of accumulated loads over time decreases. Similarly, the minimum wind thrust limit may increase depending on how much the characteristic (or optionally a ratio) indicative of the accumulated loads over time increases, and may decrease depending on how much the ratio indicative of the accumulated loads over time decreases. Also similarly, the maximum rate at which the thrust is varied may increase depending on how much the characteristic (or optionally a ratio) indicative of the accumulated loads over time decreases, and may decrease depending on how much the ratio indicative of accumulated loads increases.

The above proposed three limiting parameters (maximum, minimum thrust limits, and maximum rate of thrust variation) may be defined by suitable functions relating the limiting parameter with the characteristic(s) indicative of accumulated loads. For example, a linear function with a given slope or a more complex curve may be used for defining any of said limiting parameters as a function of the characteristic(s) indicative of accumulated loads. Any of said curves may be obtained from theoretically calculated values. These calculations may be based on simulations taking into account a theoretical model of the wind turbine. For example, a Finite Element Method (FEM) may be used for calculating said values to generate a corresponding function. In addition or alternatively to these calculated theoretical values, suitable values could also be experimentally obtained by measuring necessary parameters under controlled conditions.

In other implementations, wind speed measurements may be obtained from an anemometer 105 (see FIG. 1), such that the instantaneous representative wind speed may be determined from this wind speed measurements. The wind speed measurement (provided by the anemometer 105) upon which the determination of the instantaneous representative wind speed may be based, may be an average wind speed as measured by the anemometer 203 over a period of e.g. 1-5 seconds, e.g. 3 seconds.

Some methods provided by the invention could be implemented according to MPC principles. In these implementations, different parameters may be modelled and constrained in accordance with MPC foundations. For example, wind speed, speed of the rotor, (elapsed and expected) life time of the wind turbine, pitch actuations, yaw actuations, thrust, loads and others may be modelled and optionally constrained, even some of them with respect to others. In one example, the thrust could thus be constrained as a function of the loads accumulated by the wind turbine (possibly along its time life). Some of said MPC implementations could consider models of one or more parameters according to e.g. a multidimensional conception such as the one illustrated by FIG. 2, which will be described later on.

In some MPC implementations, the accumulated loads over time may also be modelled as e.g. a statistical constraint, such that, this statistical constraint and the thrust constraint may constitute conditions, possibly principal boundary conditions, under which the corresponding MPC process will evolve over time (i.e. during operation of the wind turbine). Once all the variables or parameters, and constraints have been properly modelled, the MPC process may start to compute them in the context of an optimization process. The process continuously produces thrust limits to keep loads suffered by the wind turbine within an acceptable range, to ensure that the life of the wind turbine is extended or at least kept under its expected time life. The "cost function" that is optimized in the MPC process may be the electrical power generated by the wind turbine. In another example, the cost function may be the financial compensation for the electrical power generated, i.e. the financial gains or benefits of a wind park operator. The financial compensation for generated electrical power may generally vary throughout the year, month and even a day. When the price of electricity is particularly high, the acceptable maximum thrust limit may be temporarily increased to generate more power. At a different time, the acceptable maximum thrust limit may be much lower than usual to compensate for fatigue damage during those high price periods.

Some or all the rules and/or logic described in relation to non-MPC implementations could also be used for modelling some or all the diverse variables, parameters, constraints to be defined in the context of MPC implementations. For example, the accumulated loads may be modelled under MPC foundations but according to a conceptual approach similar to the one illustrated by FIG. 2, in which several dimensions (time, regions of the wind turbine from which load measurements are obtained, and operational ranges depending on the wind speed) are considered.

Figure 2:
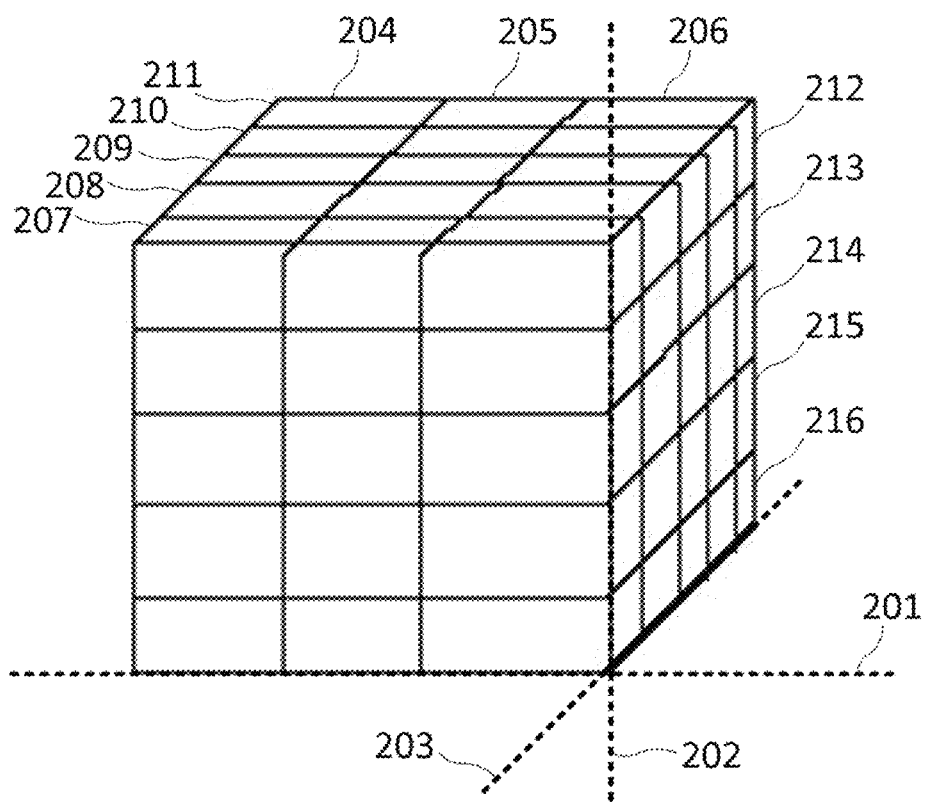
FIG. 2 is a conceptual representation of a multidimensional database suitable for being used in methods provided by the invention.

FIG. 2 is a conceptual representation of a multidimensional database suitable for being used in methods provided by the invention. In particular, this multidimensional database is shown as a cube comprising three "accumulation" dimensions 201-203. For example, a first dimension may correspond to years (or other time units, such as e.g. months), a second dimension may correspond to wind turbine regions (e.g. blades, tower, etc.) from which load measurements have been obtained, and a third dimension may correspond to operational ranges (first, second, etc. ranges). Operational ranges may be defined as follows.

Figure 4:
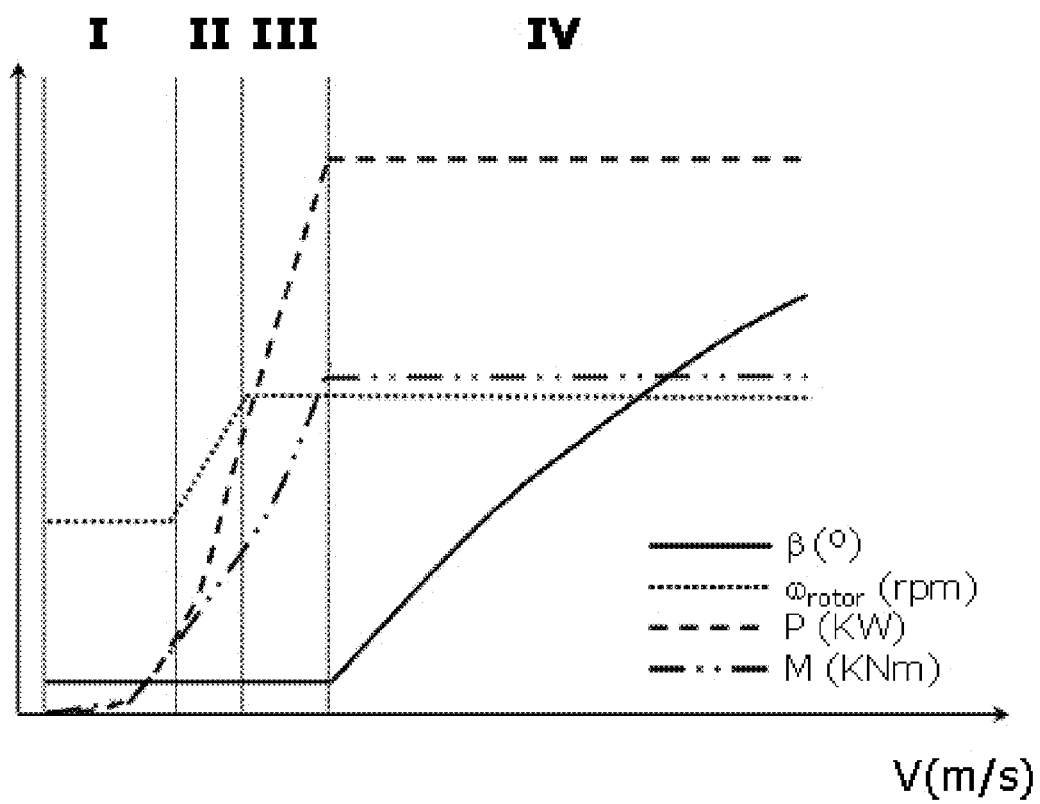
FIG. 4 is a diagram showing four operational ranges for a wind turbine.

A variable speed wind turbine may typically be controlled by varying the generator torque and the pitch angle of the blades. As a result, aerodynamic torque, rotor speed and electrical power will vary. Taking this into account, typically four (or more) operational ranges may be considered in a conventional control strategy. The operational ranges may be described with reference to FIG. 4 previously discussed.

In a first operational range, from the cut-in wind speed to a first wind speed (e.g. approximately 5 or 6 m/s), the rotor may be controlled to rotate at a substantially constant speed that is just high enough to be able to accurately control it. The pitch angle of the blades in this first operational range is maintained at 0° (the default position). The cut-in wind speed may be e.g. approximately 3 m/s.

In a second operational range, from the first wind speed (e.g. approximately 5 or 6 m/s) to a second wind speed (e.g. approximately 8.5 m/s), the objective is generally to maximize power output while maintaining the pitch angle of the blades constant so as to capture maximum energy. In order to achieve this objective, the generator torque and rotor speed may be suitably varied. In this operational range, the pitch angle of the blade is generally also maintained at 0°.

In a third operational range, which starts at reaching nominal rotor rotational speed and extends until reaching nominal power, the rotor speed may be kept constant, and the generator torque may be varied to such effect. In terms of wind speeds, this third operational range extends substantially from the second wind speed to the nominal wind speed e.g. from approximately 8.5 m/s to approximately 11 m/s. Also, in this operational range, the blades may generally be maintained in the default pitch position.

In a fourth operational range, which may extend from the nominal wind speed to the cut-out wind speed (for example from approximately 11 m/s to 25 m/s), the blades may be rotated ("pitched") to maintain the aerodynamic torque delivered by the rotor substantially constant. In practice, the pitch may be actuated such as to maintain the rotor speed substantially constant. At the cut-out wind speed, the wind turbine's operation is interrupted.

In accordance with the previously proposed example, years may be represented by dimension 201, wind turbine regions may be represented by dimension 202, and operational ranges may be represented by dimension 203. The years dimension 201 may comprise a value 204 corresponding to the current year (e.g. 2013), a value 205 corresponding to the year before (e.g. 2012), and a value 206 corresponding to two years before the current year (e.g. 2011).

The regions dimension 202 may comprise a value 212 corresponding to a first of the blades, a value 213 corresponding to a second of the blades, a value 214 corresponding to a third of the blades, a value 215 corresponding to the nacelle, and a value 216 corresponding to the tower. The operational ranges dimension 203 may comprise a value 207 corresponding to the above described first operational range, a value 208 corresponding to the second operational range, a value 209 corresponding to the third operational range, and a value 210 corresponding to the fourth operational range. If more operational ranges are defined, naturally, more operational ranges could be included along this dimension.

Therefore, in this exemplary "cube" configuration of the historical register, a three dimensional cell defined by e.g. value 204 (of dimension 201), value 212 (of dimension 202), and value 209 (of dimension 203) will thus contain an accumulated value of loads detected on the first blade of the wind turbine, during the current year 2013, and only when the wind speed has been estimated to be between 8.5 m/s to approximately 11 m/s (third operational range). With respect to the rest of the cube's cells, each of them will contain an accumulated load value corresponding to the three dimension's categories defining the cell.

In other embodiments, other cube configurations with other granularities of accumulated data may be considered. For example, other numbers of dimensions (even more than three) and other categorizations of some dimensions may be used to accumulate load values. Even, one or more of the dimensions may be structured in different levels of values (i.e. subcategories), such as e.g. the time dimension may be divided into years and each year into months, and so on. Any possible multidimensional configuration according (or similar) to the principles proposed herein, may thus permit having accumulated load data segmented in a very flexible and powerful manner, such that useful on-line and off-line analysis may be performed.

On-line analysis refers to an analysis performed during operation of the wind turbine, which may be aimed at providing data for determining the characteristic indicative of the accumulated loads. Off-line analysis refers to an analysis that may be performed at any time (during operation or not), which may be aimed at e.g. detecting anomalous situations. An exemplary off-line analysis may be based on evaluating accumulated loads for each region of the wind turbine where load measurements are taken. An off-line analysis of this type may conclude e.g. that loads suffered by the wind turbine are globally acceptable but that most of said loads have been detected on a particular region, which may be inacceptable and possibly indicative of a problem. Then, this "problematic" region may be subjected to corresponding technical revision and/or maintenance to solve or at least attenuate the detected problem.

Although only a number of particular embodiments and examples of the invention have been disclosed herein, it will be understood by those skilled in the art that other alternative embodiments and/or uses of the invention and obvious modifications and equivalents thereof are possible. Furthermore, the present invention covers all possible combinations of the particular embodiments described. Thus, the scope of the present invention should not be limited by particular embodiments, but should be determined only by a fair reading of the claims that follow.

The invention claimed is:

1. A method of operating a wind turbine having a rotor with a plurality of blades, a system for determining one or more loads on the wind turbine, a historical register of data on the wind turbine operation, and a control system for controlling one or more operational parameters of the wind turbine, the method comprising:
determining the loads on the wind turbine;
storing the determined loads on the wind turbine in the historical register:
obtaining, from the historical register, a characteristic indicative of the loads on the wind turbine accumulated over time;
determining one or more wind thrust limits depending on the obtained characteristic indicative of the loads accumulated over time; wherein determining the one or more wind thrust limits comprises determining a minimum wind thrust limit, wherein the determined minimum wind thrust limit depends on a rate of change of the characteristic indicative of the loads accumulated over time, wherein the determined minimum wind thrust limit increases when the rate of change of the characteristic indicative of the loads accumulated over time increases; and wherein the determined minimum wind thrust limit decreases when the rate of change of the characteristic indicative of the loads accumulated over time decreases; and controlling the one or more operational parameters of the wind turbine to keep a wind thrust on the wind turbine above the determined minimum wind thrust limit.

2. The method according to claim 1, wherein determining the one or more wind thrust limits comprises determining a maximum wind thrust limit.

3. The method according to claim 2, wherein the determined maximum wind thrust limit also depends on the rate of change of the characteristic indicative of the loads accumulated over time.

4. The method according to claim 3, wherein the determined maximum wind thrust limit decreases when the rate of change of the characteristic indicative of the loads accumulated over time increases; and wherein the determined maximum wind thrust limit increases when the rate of change of the characteristic indicative of the loads accumulated over time decreases, and controlling the one or more operational parameters of the wind turbine to keep the wind thrust on the wind turbine within the determined maximum wind thrust limit and the determined minimum wind thrust limit.

5. The method according to claim 4, wherein determining the one or more wind thrust limits comprises determining a maximum rate of wind thrust variation:
wherein the determined maximum rate of wind thrust variation also depends on the rate of change of the characteristic indicative of the loads accumulated over time;
wherein the determined maximum rate of wind thrust variation increases when the characteristic indicative of the loads accumulated over time decreases; and
wherein the determined maximum rate of wind thrust variation decreases when the characteristic indicative of the loads accumulated over time increases.

6. The method according to claim 5, wherein the method is implemented as a Model Predictive Control (MPC) based on imposing one or more constraints on the wind thrust on the wind turbine depending on the characteristic indicative of the accumulated loads over time.

7. The method according to claim 2, wherein determining the one or more wind thrust limits comprises determining a maximum rate of wind thrust variation.

8. The method according to claim 1, wherein determining the one or more wind thrust limits comprises determining a maximum rate of wind thrust variation.

9. The method according to claim 8, wherein the determined maximum rate of wind thrust variation depends on the rate of change of the characteristic indicative of the loads accumulated over time.

10. The method according to claim 9, wherein the determined maximum rate of wind thrust variation increases when the characteristic indicative of the loads accumulated over time decreases; and wherein the determined maximum rate of wind thrust variation decreases when the characteristic indicative of the loads accumulated over time increases.

11. The method according to claim 1, wherein the method is implemented as a Model Predictive Control (MPC) based on imposing one or more constraints on the wind thrust on the wind turbine depending on the characteristic indicative of the accumulated loads over time.

12. The method according to claim 1, wherein the system for determining one or more loads on the wind turbine comprises at least one load sensor in the root of at least one of the blades.

13. The method according to claim 1, wherein the control system for controlling one or more operational parameters of the wind turbine comprises one or more pitch systems for pitching one or more of the blades; and wherein controlling the one or more operational parameters of the wind turbine to keep the wind thrust on the wind turbine within the determined wind thrust limits comprises pitching one or more of the blades to keep the wind thrust on the wind turbine within the determined wind thrust limits.

14. The method according to claim 1, wherein the wind turbine further comprises a system for determining an instantaneous representative wind speed; wherein the method further comprises determining the instantaneous representative wind speed; and wherein at least one of the wind thrust limits is further dependent on the determined instantaneous representative wind speed.

15. A wind turbine configured to perform the method of operating a wind turbine according to claim 1.

* * * * *